April 24, 1934. A. B. DU MONT ET AL 1,955,794
AUTOMATIC AGING AND TESTING METHOD AND MECHANISM
Filed June 12, 1930 6 Sheets-Sheet 1
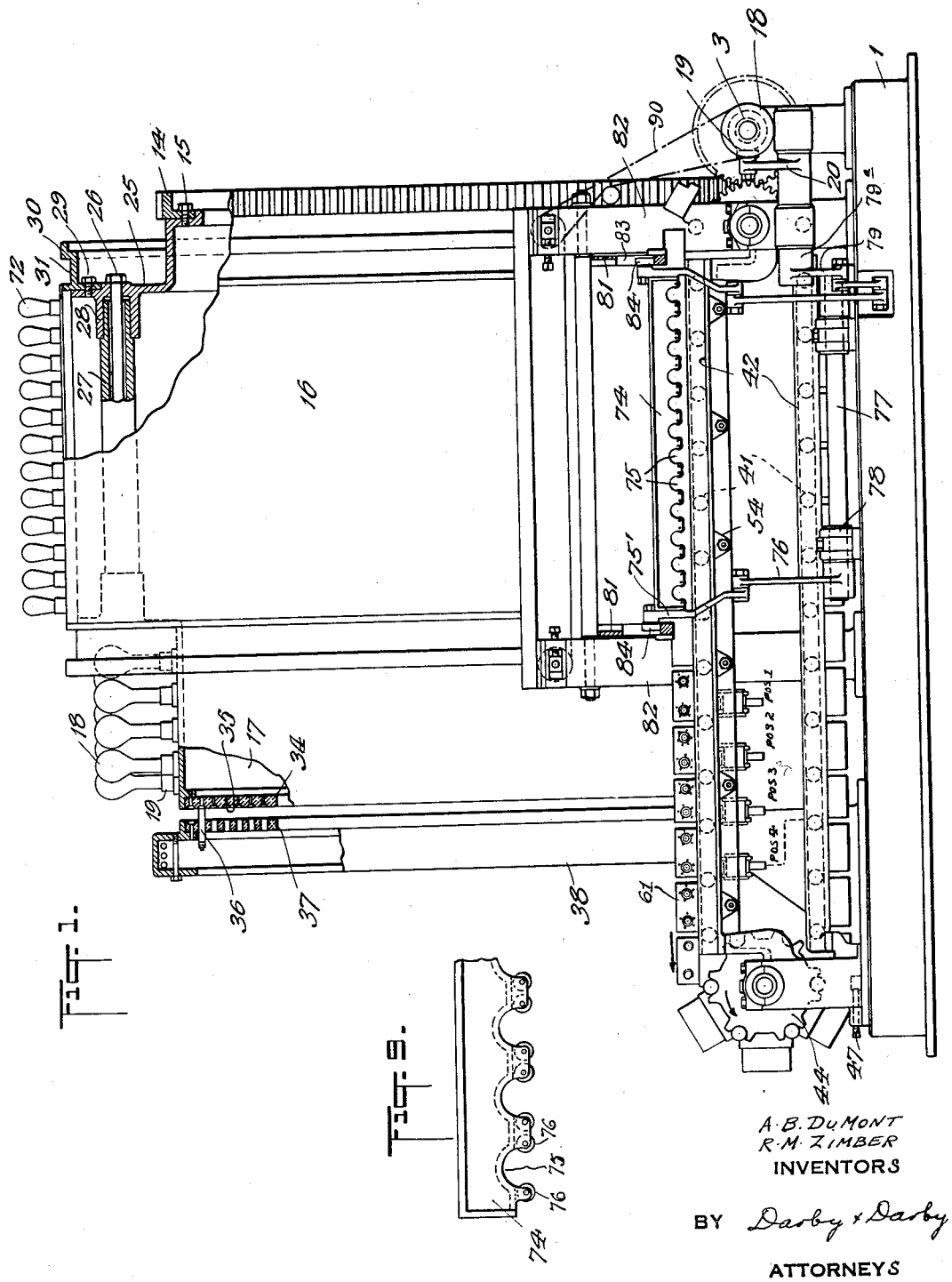
A. B. DuMont
R. M. Zimber
INVENTORS
BY Darby & Darby
ATTORNEYS

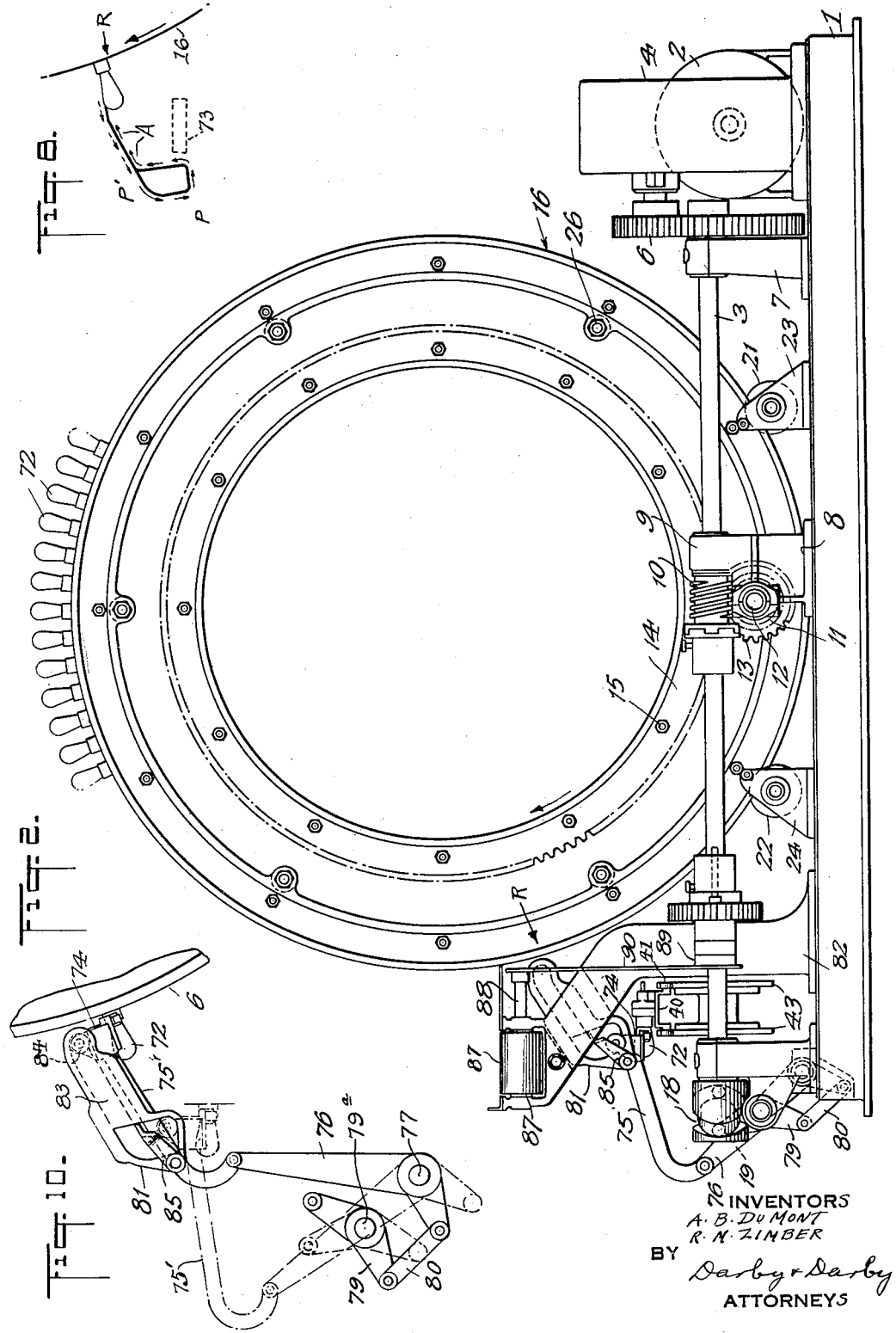

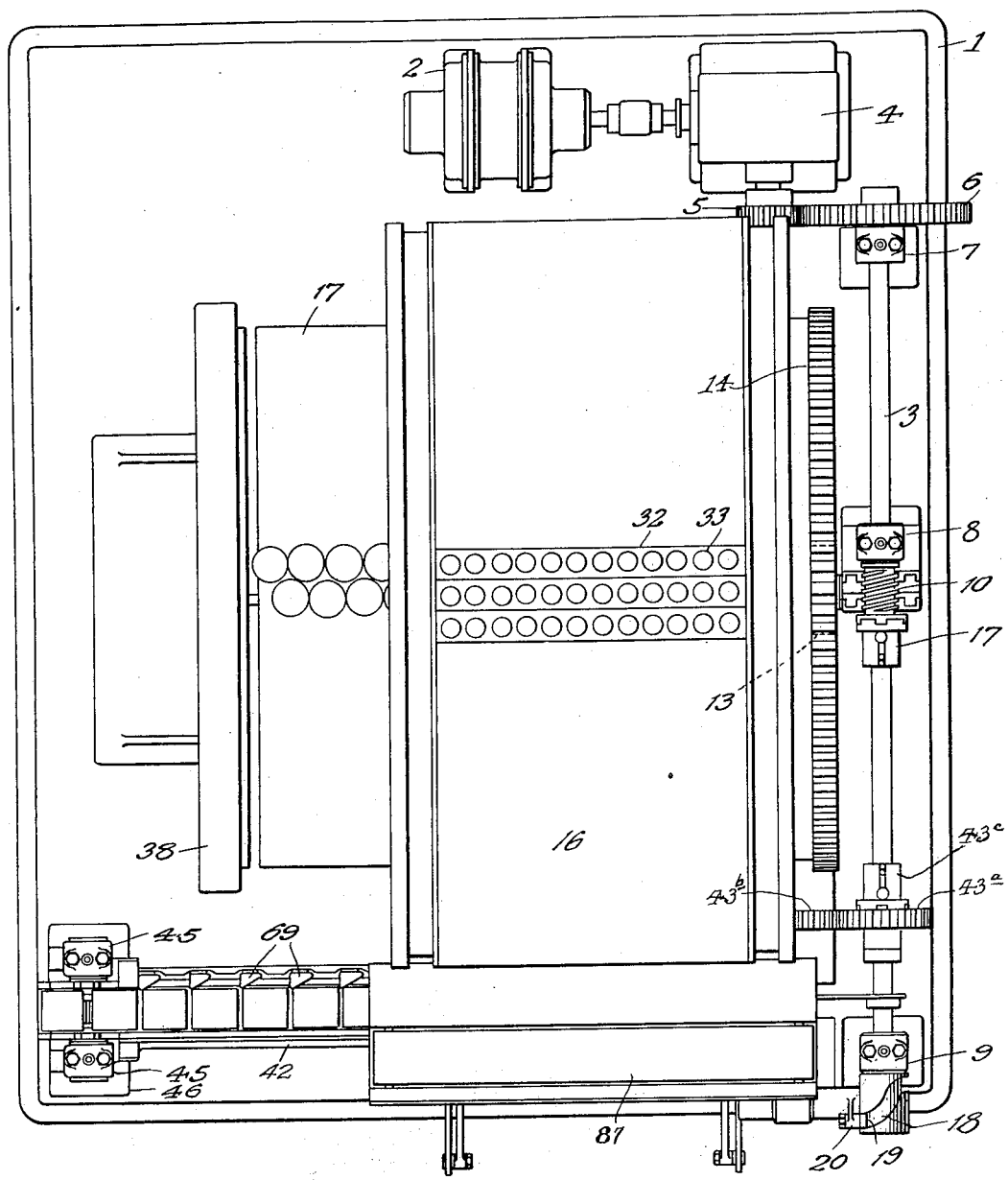

April 24, 1934.  A. B. DU MONT ET AL  1,955,794
AUTOMATIC AGING AND TESTING METHOD AND MECHANISM
Filed June 12, 1930    6 Sheets-Sheet 4
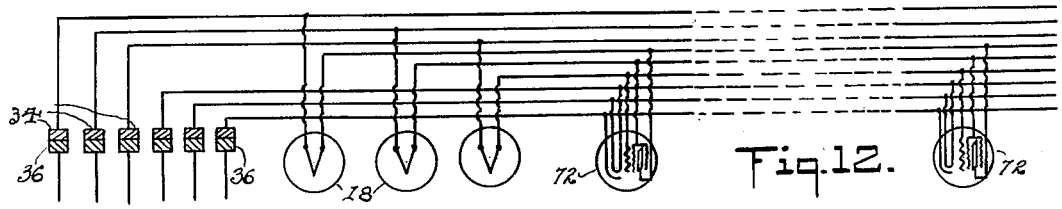
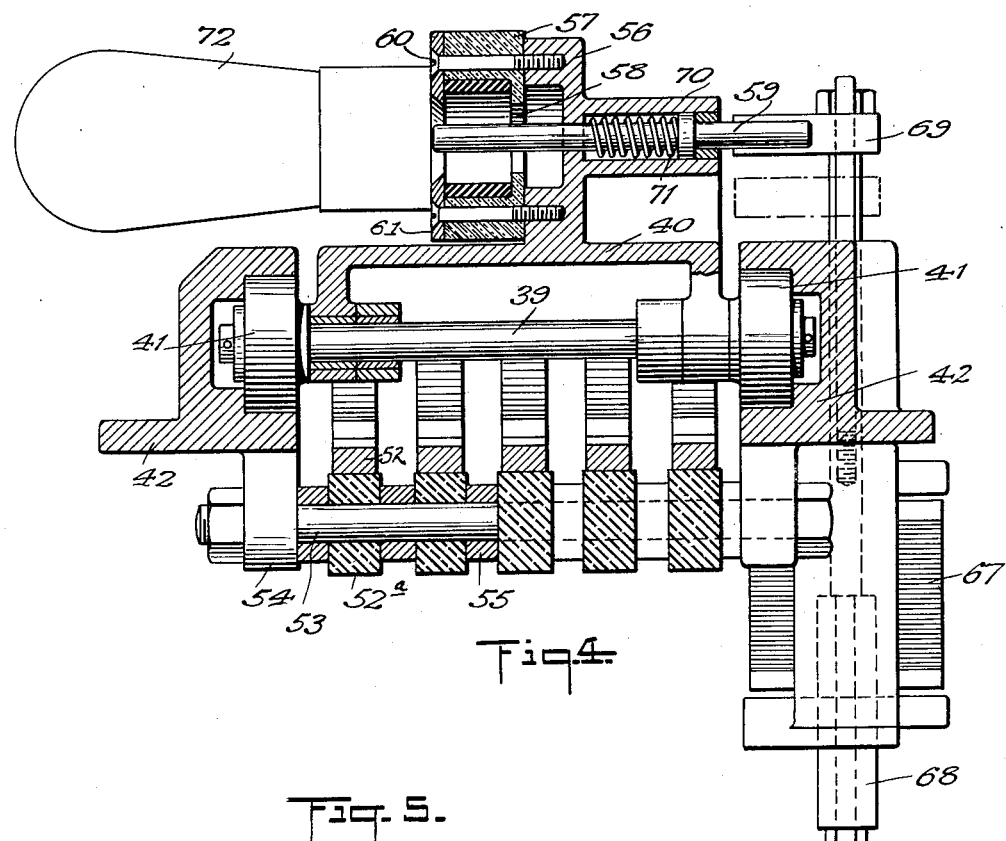
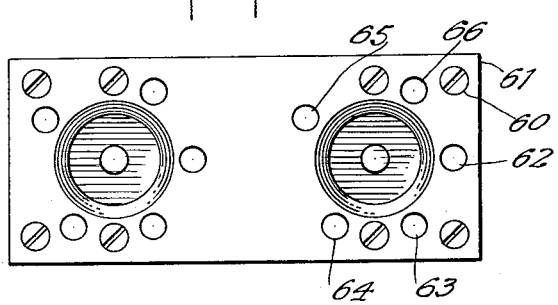
A. B. DuMONT
R. M. ZIMBER
INVENTORS
BY Darby & Darby
ATTORNEYS

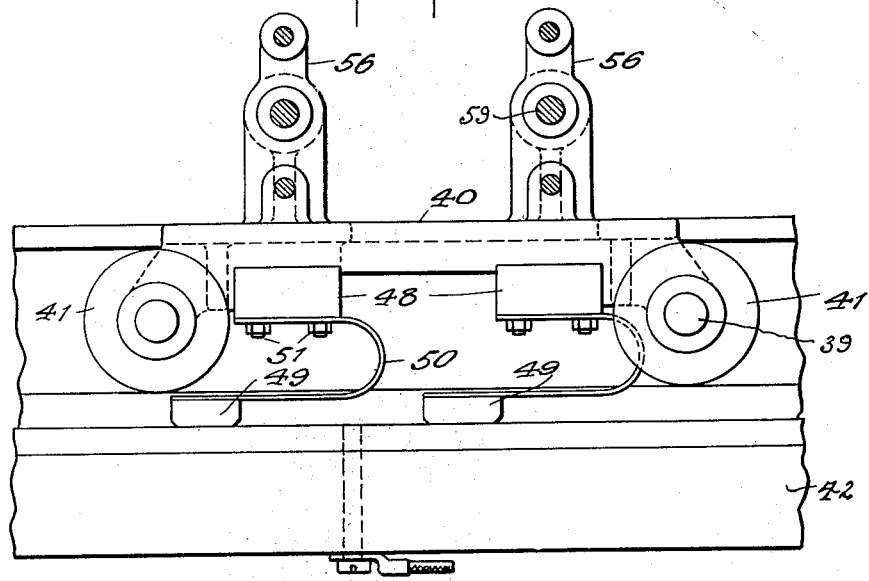
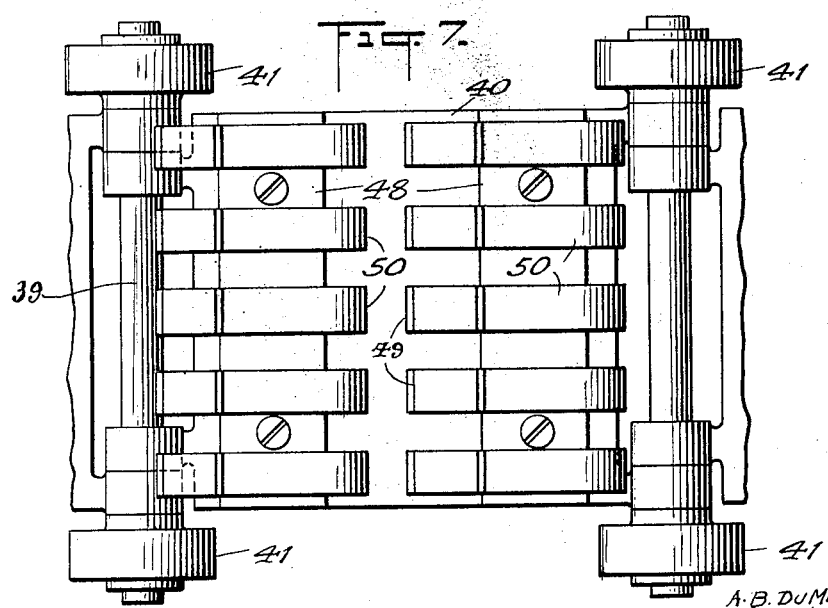

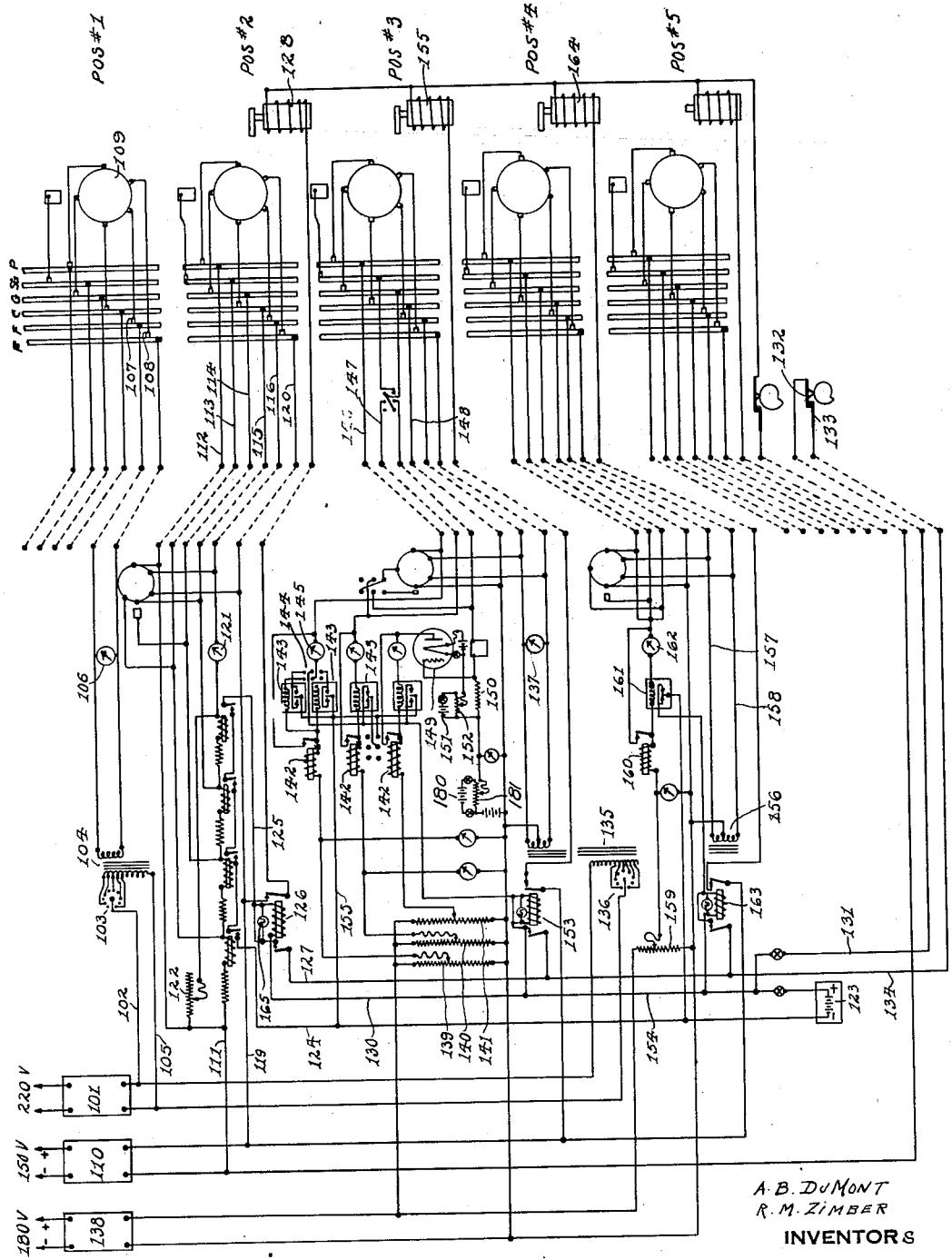

Patented Apr. 24, 1934

1,955,794

UNITED STATES PATENT OFFICE 1,955,794

AUTOMATIC AGING AND TESTING METHOD AND MECHANISM

Allen B. Du Mont, Upper Montclair, and Raymond M. Zimber, Bloomfield, N. J., assignors, by mesne assignments, to Radio Corporation of America, a corporation of Delaware Application June 12, 1930, Serial No. 460,595

28 Claims. (Cl. 250—27.5)

This invention relates to automatic machinery, and with particularity to methods and means for expediting the manufacture of and for producing uniformity in product in lamp, vacuum tube, audion and similar manufacturing establishments.

In the manufacture of such devices as lamps, audions or vacuum tubes, in general, it is requisite that each individual device be subjected to a multiplicity of tests in order that the devices not coming up to a certain predetermined standard may be segregated from the remaining devices. In vacuum tube establishments employing manual test and inspection methods, the attainment of uniformity of product is extremely difficult because of the introduction of the human equation in testing or inspecting the individual units. Furthermore, such manual testing considerably limits the overall speed of production of the plant and prevents true continuous operation from one operation to the next.

Accordingly it is one of the principal objects of the present invention to provide mechanisms for automatically testing, in a continuous manner, lamps, vacuum tubes, audions and similar devices. Ancillary to this object is the further object of achieving the test automatically under conditions which most nearly approach those under which the lamps or audions are to be actually used.

Another object of the invention is to provide mechanisms for automatically aging, for predetermined time intervals and under predetermined conditions, lamps, audions, and similar devices.

Another object is to provide an automatic mechanism for aging such devices as vacuum tubes, audions, etc. together with an automatic mechanism for testing said devices, the testing mechanism being rendered effective upon the devices within the shortest possible time interval after their removal from the aging mechanism.

Another object of the invention is to provide a continuously operating machine comprising aging and testing units wherein the lamps, audions, etc. are aged and tested simultaneously in groups.

Another object is to provide an automatic aging unit which is synchronous with a cooperating automatic test unit.

A further object relates to a conveyor type testing unit for vacuum tubes, lamps, audions, etc., which can cooperate with one or a plurality of similar aging units.

A feature of the invention relates to an aging mechanism employing a hollow rotary drum for carrying the lamps or audions to be aged. This drum is preferably, although not necessarily, operated in a continuous manner, and as a result of the type of drum employed easy access may be had to the wiring.

Another feature relates to a hollow rotary-drum aging machine wherein the drum is mounted on rollers, thus avoiding heavy shafts and bearings, and enabling the aging unit to be more accurately synchronized with other units such as an automatic test unit or the like.

Another feature relates to the manner of driving an aging machine employing a rotating drum.

A further feature relates to an aging unit of the rotary drum type wherein the electrical connections to the units being aged are effected through stationary brushes thus providing more uniform conditions for all the units being aged.

A further feature relates to an aging machine which is divided into two adjacent sections one carrying the "load lamps" and the other carrying the units to be aged. By means of this object the replacement of a load lamp and a visual indication of the effects occurring during the aging process are much more conveniently attained.

Also as a result of this method of dividing the load lamps and units into groups the units to be aged may be removed simultaneously in groups without interfering with the load on the remaining devices being aged.

A further feature relates to a novel device for automatically gripping and transferring one or a plurality of devices such as lamps, audions or the like.

A further feature relates to an automatic test unit employing a belt or similar conveyor which is preferably, although not necessarily, continuously operated in synchronism with a cooperating aging unit.

A further feature relates to an automatic aging unit and an associated automatic test unit, together with means for synchronizing both units and transporting at the same time a group of lamps or audions directly from an aging unit to a testing unit. As a result of this latter feature the lamps or audions are transferred almost immediately from the aging unit to the test unit, and are subjected to the different tests without any substantial diminution in the temperature condition of the lamps or audions that they attain in the aging unit.

A further feature relates to a novel mechanical movement for transferring an article from one machine or unit to a cooperating machine or unit.

A further feature relates to an automatic test mechanism of the conveyor type wherein the lamps or audions to be tested are caused to travel along a plurality of conducting tracks. As a result of this arrangement the device is extremely flexible as regards different tests that are to be performed on the lamps or audions.

A still further feature of the invention relates to mechanism for transporting lamps, vacuum tubes or similar devices from one machine or unit to another machine or unit, and subjecting the lamps or audions to a testing or other operation while being so transported.

A still further feature relates to a unitary machine for effecting automatic aging and testing of lamps, audions and similar devices, together with means for rendering either one or both of the units selectively effective.

A still further feature relates to an automatic aging unit and an automatic testing unit adapted to be operated in synchronism together with a feeding conveyor which is operated in timed relation to both said units and adapted to feed lamps or audions at the proper speed to the aging unit.

Another feature relates to the organization, arrangement and relative location of parts which go to make up an efficient, economical and easily maintainable machine for automatically aging and testing lamps, audions and similar devices.

Other features and advantages not specifically enumerated will be apparent after a consideration of the following detail descriptions and the appended claims.

Referring to the drawings:

Fig. 1 shows in front elevation an automatic aging and testing machine according to the invention;

Fig. 2 is a right hand end view of the machine shown in Fig. 1;

Fig. 3 is a top plan view of the machine shown in Figs. 1 and 2;

Fig. 4 is a sectional view of the conveyor and part of the testing mechanism shown in Figs. 1, 2 and 3;

Fig. 5 is a detail view of the gang socket for receiving vacuum tubes or other similar devices to be tested;

Fig. 6 is a detail view showing the relation between the contacting rails of the test mechanism and the sliding contacts on the conveyor test mechanism;

Fig. 7 is another view of the mechanism shown in Fig. 6;

Fig. 8 is a schematic diagram showing the path of movement of the tube transfer rack;

Fig. 9 is a detail view of a portion of the tube transfer rack;

Fig. 10 is a detail view of the mechanism for controlling the movement of the transfer rack;

Fig. 11 is a wiring diagram of the test mechanism;

Fig. 12 is a schematic wiring diagram of the aging circuits.

Referring to the drawings wherein the same designation numerals are used for similar parts throughout the several figures, the numeral 1 (Figs. 1, 2 and 3) represents a base of cast metal or other similar material for supporting the entire mechanism about to be described. This base may be provided with anchoring means whereby the mechanism may be anchored to a floor or other convenient place. Attached to the base 1, adjacent the rear edge thereof (Fig. 3) is a motor 2, which is preferably of the variable speed type. Motor 2 is adapted to drive a main shaft 3 which is coupled to the motor through suitable reduction gearing represented schematically by the numeral 4, and by the gear trains 5 and 6. Shaft 3 is supported for rotation in a set of bearing brackets 7, 8 and 9. Mounted on shaft 3, intermediate the ends thereof and adapted to be selectively coupled thereto is a worm 10 which drives a corresponding worm gear 11 mounted on a short shaft 12, Fig. 2. Shaft 12 carries at its inner end a pinion gear 13 which meshes with a circular rack 14 attached by means of suitable bolts 15 to the aging drum indicated generally by the numeral 16. For the purpose of selectively coupling the drum 16 to the shaft 3 there is provided a clutch schematically represented by the numeral 17. This clutch may be of any well known type. By this arrangement therefore the shaft 3 may be maintained in continuous rotation by the motor 2 and the drum 16 may be operated at any desired intervals. Attached to the extreme forward end of shaft 3 is a shrouded cam 18. Cooperating with cam 18 is a cam follower roller 19 attached to a lever 20 which controls the novel movement of the transfer mechanism described hereinafter. Suffice it to say for the present that the cam 18 subjects the transfer mechanism to a movement which is schematically illustrated in Fig. 8.

Referring more particularly to Fig. 1 and Fig. 2, it will be noted that the entire weight of drum 16 is supported by two sets of rollers 21 and 22 mounted for rotation in corresponding brackets 23 and 24, there being a set of rollers associated with each edge of the drum. The drum itself comprises two annular end sections 25 which are adapted to be rigidly united by means of a plurality of transverse bolts 26. For the purpose of properly spacing the end sections 25, the bolts 26 pass through associated cast metal sleeves 27 the ends of which sleeves register with and seat themselves in corresponding annular bosses 28 formed integrally on the inner faces of each of the end sections. Attached by means of bolts 29 to the outer edge of each of the sections 25 is an annular track member 30 having a recessed track portion 31 with which the rollers 21 and 22 register.

From the foregoing it will be seen that the drum is a hollow drum which is easily assembled and wherein the entire weight is borne by the peripheral face of the drum, thus avoiding the use of spiders and axial shafts for supporting the drum and likewise rendering the drum completely open to inspection on the interior. This particular manner of supporting and driving the drum is of outstanding importance in the present machine since the utmost accuracy must be maintained between the drum's rotation and the conveyor and transfer mechanism hereinafter described. With the ordinary method of supporting the drum by means of spiders exceedingly heavy shafting must be employed and it is very difficult to properly mount the drum and maintain it in exact alignment with the other units with which it is to cooperate.

From Figs. 1 and 3 it will be noted that the drum 16 at its left hand end is provided with a hollow extension 17 of reduced diameter. Portion 17 is adapted to carry the usual load or resistance lamps 18, which are supported on the drum portion 17 in suitable sockets 19. To reduce the overall axial length of the drum the lamps 18 in adjacent rows are preferably staggered as shown clearly in Fig. 3. The main portion of drum 16 carries a plurality of sockets to receive the lamps, audions or other vacuum tubes to be aged. Any suitable type of socket for this purpose may be employed. However, it is preferred to arrange the sockets in longitudinal gangs. For example, as shown in Fig. 3, the numeral 32 represents a strip of insulation which is attached in any suitable manner to the edges of the drum 16, each strip carrying a plurality of sockets 33, the design of these sockets being dependent of course upon the type of lamp or audion to be aged and tested. Attached to the left hand end of the reduced drum portion 17 is an annular strip 34 preferably of insulating material carrying a plurality of circular metallic tracks or commutating strips 35. The number of strips will of course depend upon the number of tests or electrical conditions to be applied to the lamps or audions while they are undergoing the aging process. The details of this wiring and the several tests will be described hereinafter in connection with Figs. 11 and 12.

Cooperating with each of the commutator strips 35 is an associated spring pressed brush 36. The brushes 36 are likewise mounted in an annular strip 37 of insulating material attached in any convenient manner to an annular bracket 38 mounted on the main base 1. Any suitable means (not shown) may be employed for regulating the tension on each of the brushes 36.

From the foregoing it will be seen that the brushes are at all times visible from the left hand end of the machine, and that the entire interior of the drum is likewise open to inspection, thus enabling repairs and wiring changes to be most expeditiously accomplished. It will be understood of course that a greater or fewer number of brushes may be employed than are shown in the drawings, and each of the commutator strips instead of being electrically continuous may be made in insulated sections so as to subject the lamps or audions to any desired cyclically recurring intermittent electrical conditions.

Disposed in front of the aging drum 16 and adapted to be moved in synchronism therewith is a conveyor according to the invention. This conveyor comprises a plurality of spaced horizontal links 39 (Fig. 4) on which are mounted the conveyor sections 40. Each of the links 39 carries at opposite ends a pair of rollers 41 which are adapted to ride within corresponding fixed rails or guides 42. Rails 42 are rigidly supported by suitable brackets from the base 1. The conveyor is moved preferably in a continuous step-by-step motion by means of a pair of cog wheels 43 adapted to be driven from shaft 3 through intermittent gears 43ª and 43ᵇ and clutch 43ᶜ. A similar pair of cog wheels 44 are mounted for rotation in bearing brackets 45 attached to the left hand front corner of the base 1. The brackets 45 may be mounted on a common frame 46 which is preferably provided with an adjusting screw 47 whereby the cog wheels 44 may be adjusted to take up any slack that may occur in the body of the conveyor. By means of clutch 43ᶜ the conveyor may be driven in synchronism with the drum 16 or the conveyor may be held stationary while the drum 16 rotates and vice versa.

From the foregoing it will be seen that the conveyor as a whole is driven in a positive manner from the shaft 3 and that while it is moving past the aging drum 16 the conveyor sections 40 are subjected to an accurate linear movement due to the engagement of the rollers 41 with the fixed rails 42.

Referring more particularly to Figs. 4, 5, 6 and 7, it will be noted that each of the conveyor sections 40 is provided with two pairs of rollers 41 (Fig. 6). Each of the sections 40 likewise carries a pair of insulator blocks 48 to each of which blocks is attached a plurality of contacting shoes or brushes 49. As will be seen from Figs. 6 and 7 the shoes 49 are preferably attached to the insulating blocks 48 by means of U-shaped springs 50 and suitable bolts 51. While in the drawings each of the blocks 48 carries a set of five brushes, it will be understood that any greater or less number may be employed, depending upon the type of tube to be tested. Each of the brushes 49 is adapted to ride upon and contact with an associated rail or contact strip 52 attached to a strip of insulation 52ª. These contact rails are supported in proper spaced relation upon a plurality of cross members 53 attached to downwardly depending brackets 54 supported by the fixed rails 42. It will be obvious of course that the strips 52 are properly insulated from the frame of the machine and are spaced from one another by means of the washers 55. The length of the strips 52 will of course depend upon the duration of the tests and their character. Thus certain of the strips may be continuous and others may be made in insulated sections as described in detail hereinafter in connection with Fig. 11.

Each of the conveyor sections 40 is formed with a pair of vertical standards 56 to which are attached the vacuum tube sockets. While any well known socket construction may be employed, it is preferred to employ a two-socket gang as shown in Fig. 5. Thus the socket may comprise a rectangular metal box-like member 57 of insulating material having a pair of holes 58 in the wall thereof through which pass the ejecting plungers 59 described hereinafter. Attached by means of screws 60 to the open face of the member 57 is a rectangular strip of insulating material 61 which is provided with suitable openings 62, 63, 64, 65, 66 to receive the contact prongs of the vacuum tube. It will be understood, of course, that associated with each of the holes 62 and insulatingly mounted within the member 57 are corresponding spring contacts with which the vacuum tube prongs engage when the vacuum tube is plugged into the socket. Mounted on the conveyor track frame 42 are a series of electro-magnets 67, there being one of these magnets for each of the conveyor sections 40. Each of the magnets 67 is provided with a plunger-like core 68 which is adapted to be moved upwardly when the magnet 67 is energized under conditions hereinafter described. Attached to the upper end of each plunger 68 is a triangular shaped cam 69. When a magnet 67 is deenergized the associated plunger 68 is retained in its uppermost position by suitable spring means (not shown), wherein the member 69 rests upon the conveyor frame 42, thus limiting the downward movement of the plunger. On the other hand when a magnet 67 is energized the associated plunger is raised to the position indicated in full lines in Fig. 4, wherein the cam 69 is in alignment with the rear end of the ejecting plunger 59. This plunger 59 is mounted for reciprocating movement within a hollow boss 70 attached to the associated upright 56, and is normally maintained in the backward position shown in Fig. 4 under control of a spring 71. In this position the forward end of the plunger does not protrude beyond the surface of the socket. However, as the conveyor moves in the direction of the arrow (Figs. 1 and 3) and assuming that a magnet 67 is deenergized then the member 69 being temporarily raised forces the plunger 59 towards the left (Fig. 4) and thus ejects the vacuum tube 72 from its socket. It will be understood of course that a magnet 67 is only deenergized when the tests indicate that the associated tube is defective. At the completion of the test the tubes that have been found to meet the test conditions upon arriving at a certain point in the travel of the conveyor engage a fixed stop similar to the member 69, and at this point the tubes are ejected into a conveyor which is separate from the conveyor used for the defective tubes. In connection with audions and similar devices it has been found that certain types of tests are more reliable when performed with the filament or heater element at or about its normal operating temperature. Accordingly the mechanism disclosed is designed to perform the tests within the shortest possible interval after their removal from the aging drum 16. In order to effect the transfer of the tubes from the aging drum to the test conveyor there is provided a novel form of mechanism, the gripper device of which performs the cycle of movements indicated schematically in connection with Fig. 8. In this figure the aging drum 16 is shown as rotating in the direction of the arrow, and the test conveyor is indicated schematically by the numeral 73.

In order to transfer a tube from the drum 16 to the conveyor 73 it is necessary first to cause the transfer gripper device to move in a direction substantially radial to the drum surface until the gripper device grips either the envelope portion or the base portion of the vacuum tube. This initial movement of the transfer device is represented by the full line arrows in the path schematically represented in Fig. 8. After the device has been firmly gripped the transfer is then subjected to reverse movement as indicated by the dotted arrows, to withdraw the tube from the drum socket, and is then subjected to a further inclined downward movement to a point P in front of the conveyor 73, as indicated in Fig. 8. The gripper device carrying the tube thus removed from the aging drum is caused to travel in a reverse horizontal direction as indicated by the horizontal arrow whereby the tube is plugged into a socket on the test conveyor. The gripper mechanism is then moved upwardly in a substantially straight line to free the gripper device from the tube and the gripper mechanism is then moved in an inclined upward path as indicated by the arrows $a$, thus bringing the gripper device into position to grip and remove a succeeding tube from the aging drum and completing the cycle of movement. While the tubes may be removed from the aging drum one at a time, it is preferred to remove them in batches, thus the mechanism shown in the drawings is designed to unplug a complete row of tubes from the aging drum and to plug this same row of tubes simultaneously into the test conveyor. One form of gripper mechanism that has been found to achieve exceedingly good results comprises a bar 74 (Fig. 9) of metal or other material having a plurality of circular notches 75 slightly larger than the base portion of the tubes to be transferred. Mounted on opposite edges of each notch are resilient rollers 76 which project slightly beyond the edges of the notch, so that when the bar 74 is moved downwardly over the tube base the said base is in effect wedged between the rollers 76 which may be made of rubber or other material having a friction or gripping surface. On the other hand, when the tube is held fast as by being plugged into the test conveyor and when the bar 74 is raised the gripper mechanism frees itself from the tube. Thus as shown clearly in Fig. 1 the transfer bar 74 is provided with a plurality of separate gripper units each unit corresponding to a circumferential row of tubes in the drum 16. Bar 74 is attached to the upper ends of a pair of curved levers 75' which in turn are pivotally supported on the long arms of a corresponding pair of bell crank levers 76. Levers 76 are attached to the shaft 77 which is mounted for rotation in suitable brackets 78 on the base 1. The bell crank levers 76 are adapted to be oscillated back and forth to the dotted and full line positions (Fig. 10). The short arm of lever 76 is connected to another lever 79 through a link 80. Lever 79 is attached to shaft 79$^a$ which also carries the lever 20 hereinabove described.

The movement of the bar 74 along the path shown in Fig. 8 is controlled by a pair of guide frames 81 which are fastened to uprights 82. Each of the members 81 is provided with a cutout portion 83 which provide tracks or guides for corresponding rollers 84 attached to the levers 75. Pivotally attached to each of the members 81 is a latch 85. The function of the latch 85 is to deflect the rollers 84 on their return path from the drum so that the tubes carried by the transfer bar 74 clear the front edge of the test conveyor. On the other hand, after the tubes are plugged into the test conveyor and the rollers 84 begin their upward movement, due to the weight of the transfer mechanism, they follow the lower edge of the opening in the members 81 and are not deflected by latches 85 which merely rotate out of the way. In other words the latches function to control the portion of the upward and downward movements included between the points P and P' (Fig. 8). In order that the tubes may be fed to the aging drum as fast as they are being transferred therefrom to the test conveyor there is provided another band-like conveyor 87 the rollers of which are supported in opposite portions of the uprights 82. The spindles 88 for the feeding conveyor rollers are driven by means of a pulley 89 and a belt 90 driven from the shaft 3.

With the foregoing detail description in mind it is believed that the general operation of the machine will now be understood. For this purpose it will be assumed that the drum 16 and the test conveyor have been set in motion by means of the motor 2 and that a supply of tubes to be aged and tested is fed onto the feeding conveyor 87. The operator thereupon plugs these tubes into the sockets 33 on the drum 16 which rotates in the direction of the arrow. As the drum is thus rotating the proper potentials are applied to the filament, grid, plate and cathode of each tube through the brushes 36, the commutator strips 34 and the load lamps 18, the circuits being set forth in detail in Fig. 12 of the drawings. The drum continues to rotate at the required speed so as to subject the tubes or audions to the requisite portion of the predetermined electrical conditions. Consequently as the row of tubes reaches the point R (Figs. 2 and 8) the tubes are ready to be transferred to the test conveyor.

It will be understood of course that while the drum is rotating the arm 20 is also being actuated by the cam 18 and through the intermediary of the mechanism disclosed in detail in Fig. 10 the transfer gripper bar 74 is brought into substantial vertical alignment with the base of the row of tubes as shown in the full line position of Fig. 10. Upon a slight further rotation of the drum the tubes are wedged in between the gripper rollers 76 and the gripper bar and shortly thereafter the cam 18 effects the reverse movement of the gripper bar, withdrawing the complete row of tubes from the aging drum. Under control of the members 81 the gripper bar carrying the complete row of tubes begins to move away from the drum until the rollers 84 disengage the latches 85 at which time the tubes are substantially in the position indicated by the letter P in Fig. 8. In this position the tubes are in horizontal alignment with the sockets in the test conveyor 73, but are slightly forwardly in advance thereof. Under control of the cam 18 the group of tubes is subjected to a horizontal movement causing them to be plugged into the sockets carried by the test conveyor after which the gripper bar is again subjected to a vertical movement to disengage itself from the group of tubes which have been thus plugged into the test sockets. As the conveyor 73 advances in the direction of the arrow, each socket carrying a tube is advanced to the filament and short testing position. In this position the filament is tested for open circuits and also the proper filament voltage is applied. At the same time the circuits are completed through appropriate relays to the remaining electrodes of the tube, and any short circuits between the elements will be detected as hereinabove described.

If the filament and the remaining electrodes meet the conditions of the test the associated electro-magnet 67 remains deenergized and the cam 69 is therefore held out of the path of the ejecting plunger 59. If, on the other hand the test at this point reveals a defective filament or a short circuit to any of the electrodes the associated magnet 67 becomes energized as hereinafter described as interposing the cam 69 in the path of the ejecting plunger 59. Consequently as the tube is moving to the next position the plunger 59 is actuated and ejects the defective tube from the conveyor into an appropriate chute positioned adjacent the conveyor. The conveyor next advances the tube to position 2 at which position circuits are completed for measuring the plate current of the tube. If the tube is of the double or shield grid type in position 2 circuits also are completed for measuring the screen grid current. In the second position also the tube is subjected to an exact current test and if the tests of the second position indicate filaments above or below the predetermined limits the magnet 67 at the second position is deenergized and the tube is automatically ejected. However, if the tube is up to the standard set the conveyor advances it to the third position wherein the emission from the cathode is automatically measured.

There is shown in Fig. 1 a fourth position at which any further additional test on the tube may be accomplished. If a tube passes the fourth position without being ejected it will reach the final position where it will be ejected into a suitable trough for receiving tubes that are up to the set standards.

The foregoing cycle of operations is of course completed for each row of tubes on the aging machine, and it will be understood of course that the test conveyor is advanced in a proper timed relation with respect to the rotation of the aging drum, so that all the necessary tests on a previously transferred row of tubes may be completed while the aging drum is bringing the succeeding row of tubes into the transferred position.

In the event that it is desired to use the machine solely as an aging machine the clutch 43$^c$ will be moved to unclutched position in which case the drum 16 alone will rotate. On the other hand should it be desired to use the testing unit alone then the clutch 43$^c$ is thrown in and the clutch 17 is disengaged, thus allowing the test conveyor to be operated while the drum is stationary.

By this arrangement it will be observed that the aging drum may be given a plurality of revolutions prior to the transfer of the tubes to the test conveyor.

Referring to Fig. 11 a description will now be given of the detail wiring diagram of the test mechanism. While the test conveyor shown in Figs. 1 to 10 employs sets of five contact and five associated contact rails it will be understood of course that a greater or less number of brushes and rails may be provided. Thus in Fig. 11 there are shown circuits for testing so-called four element tubes, that is tubes having a heater filament, an electron emitting cathode, a controlling grid, a shield grid and a plate or anode. For each of these elements therefore there are provided corresponding conducting rails F, F, C, G, SG, P at each of the respective test positions of the conveyor mechanism. Position 1 is the preheating position wherein the heater element or filament is brought to the proper temperature. At position 2 tests are made for continuity of filament and short circuits between the electrodes. At position 3 the tube is tested for gas, shield grid current and plate current. At position 4 the tube is tested for cathode emission. Position 5 represents a spare position at which any other desired test may be effected on the tube.

Let it be assumed that a row of tubes has been automatically transferred from the aging drum to the test conveyor as hereinabove described and that the first tube of this transferred group has been advanced to the first testing position. In the first position current is applied to the filament from a 220 volt source through the safety switch 101 over conductor 102 through the multi-tap switch 103 through the primary step-down transformer 104, returning through conductor 105 to the other side of the power source. A filament meter 106 is connected across the transformer secondary to measure the voltage applied to the filament. This voltage is connected to the test rails F, F, at the first position and thence through the brushes 107 and 108 to the filament terminals of the vacuum tube socket 109. As the conveyor advances the tube in socket 109 is moved to position 2 where 150 volts is connected over the positive lead through the safety switch 110 through conductor 111, thence in parallel to the conductors 112, 113, 114, 115 and 116. In series with each of the conductors 113, 114, 115, 116 and the conductor 111 is a resistance 117 and a relay 118. In other words the circuit between conductor 116 and conductor 111 includes four resistances 117 and four relays 118 in series, while the circuit between conductor 115 and conductor 111 includes a set of three resistances and three relays in series. The circuit to conductor 114 includes two resistances and two relays in series and the circuit to conductor 113 includes a single resistance and relay. The negative side of the line is connected directly through conductors 119, 120 to the filament rail. Thus there is provided a series circuit between the source of 150 volts D. C. and the filament of the tube including the ammeter 121 and all the resistances and relays 117, 118 in series. The entire set of resistances and relays is shunted by a variable resistance 122 by means of which the proper filament current may be maintained. The resistances may be so designed, for example, that there is a voltage drop of approximately 148 volts across the four resistances and relays and that this voltage drop is divided into four sets of approximately 37 volts across each resistance 117 and relay 118. By means of conductors 112, 113, 114, 115, the plate, shield grid, grid and cathode elements of the tube under test are respectively connected to the points between the relays as shown. It will therefore be seen that if a short circuit exists between any two elements of the tube this short circuit will by-pass one or more of the relays 118 thus preventing the operation of a relay or relays. For example, if the filament of the tube is open or burned out the entire series circuit is broken and none of the relays 118 operates. It will be noted that all of the contacts of the relays 118 close a chain circuit including the battery 123, conductor 124, contacts of relays 118, conductor 125, winding of relay 126, conductor 130 to the opposite side of battery 123. It will be seen therefore that so long as any of the relays 118 is deenergized the magnet 126 likewise is deenergized and consequently the ejecting magnet 128 likewise is deenergized. On the other hand, should the tube exhibit no defects in which case all the relays 118 are operated, the circuit through relay 126 above described is completed. Relay 126 upon operating completes a locking circuit for itself which is independent of the relays 118.

The relay 126 is thus held energized until the tube under test has passed the ejecting position. The tube now passes on to the third position where 220 volts is applied to the primary winding of transformer 135 through the multi-tap switch 136. A volt meter 137 is connected across the secondary of the transformer to indicate the proper voltage that is to be applied to the filament at the third position. A source of 180 volts D. C. is connected at the safety switch 138 and to the potentiometers 139, 140, 141. The variable arm of potentiometer 139 is connected through a protecting relay 142 and a plate current measuring meter 143. It will be noted that a pair of meters 143 is associated with the relay 142 and that a double pole double throw switch 144 is adapted to connect either of the meters in circuit with the milliammeter 145. The other terminal of the milliammeter is connected through conductor 146 to the plate rail and thence to the plate terminal of the tube at position 3. Similarly the proper voltage is applied to the screen grid rail through conductor 147 and a similar relay 142 and milliammeter under control of the potentiometer 140. Similarly the proper grid voltage is controlled by the potentiometer 141 through the associated protecting relay and current measuring device. The circuit to the grid rail also includes a vacuum tube voltmeter 149 the plate potential of which is regulated by the potentiometer 141. The grid filament circuit of the tube voltmeter 149 is connected across the resistance 150 in series with a biasing battery 151 and a potentiometer 152, by means of which the plate current of the voltmeter tube 149 may be kept within the desired limits and this in conjuction with the battery 180 and potentiometer 181 enables the potential on the grid of the tube under test to be maintained constant. The function of the protecting relays is to operate upon excess current and thus protect the milliammeter and measuring instruments from overloading. The negative side of the 180 volt source is connected directly to the cathode rail through conductor 148. The circuits are so designed that for given predetermined values of plate current and shield grid current the armatures of the current-meter relays 143 are central between the adjacent contacts. Should, therefore, the plate current or the shield grid current of the tube under test at position 3 be above or below the required value, one or more of the relays 143 operates and in so doing closes a circuit for the magnet 153. This circuit may be traced from the positive side of battery 123, conductor 154, winding of magnet 153 through the closed contact of the operated relay 143, conductor 155, thence to the negative side of the battery 123. Magnet 153 operates and closes a locking circuit for itself similar to the circuit for magnet 126 hereinabove described. This locking circuit being under control of the time relay contacts 132 and 133. Under these conditions therefore the circuit for the ejecting magnet 155 is broken and therefore the defective tube at position 3 is ejected as hereinabove described.

It will be noted that at position 3 if there is any gas current in the tube under test a corresponding voltage drop will be produced across the resistance 152 as a result of which the plate current and the voltmeter tube 149 is increased closing the circuit of the associated relay 143, which in turn controls the magnets 153 and 155 in a similar manner to that already described. In this connection it will be noted that should the voltmeter vacuum tube itself fail, the same condition will be produced as if the tube under test exhibited an improper gas current thus preventing false tests due to failure of the voltmeter.

If, however, in position 3 the tube under test comes up to all the standards, magnet 153 will not operate and consequently magnet 155 will remain operated and permit the tube to pass to the next position. Thus the tube at position 3 has been tested for high and low plate current, high and low screen grid current and gas currents. The tube is thereupon advanced to position 4. In position 4 filament voltage from another secondary winding 156 of the transformer 135 is applied over conductors 157 and 158. The positive terminal of the 180 volt source is connected through the potentiometer 159, protecting relay 160, measuring relay 161, milliammeter 162, and thence in parallel to the plate, shield grid and grid terminals of the tube under test. Thus the milliammeter 162 registers the total emission from the cathode of the tube in position 4, which cathode is connected to the negative terminal of the 180 volt source. If the emission is equal to or above the required value the contact of relay 161 closes and an operating circuit is closed for magnet 163 which in turn locks under control of the time contacts 132, 133, as hereinabove described. Consequently the ejecting magnet 164 is maintained energized and prevents the ejection of the tube as defective. On the other hand, should the emission be less than that required, relays 161 and 163 remain normal and the ejecting magnet 164 becomes deenergized and controls the ejection of the tube as defective. In position 5 any other desired electrical tests may be performed on the tube. A tube having passed the first four positions will therefore proceed to the final position where it will be ejected in the usual manner and conveyed to a packing device. It will be noted that pilot lamps 165 are connected in parallel with the test control magnets 126, 153, 163 respectively to indicate visually when rejects occur at the respective positions.

While the circuits are designed for the testing of one particular type of tube, it will be understood that the same general arrangement may be used to test other types of vacuum tubes as will be apparent to those familiar with the art.

While in the description the term vacuum tube has been employed to denote one kind of vacuum device, it will be understood that in the claims this expression is intended to cover vacuum tubes generally, such as lamps, audions, rectifiers, X-ray devices, etc. which are to be aged and tested during manufacture.

It will also be understood that while the machine finds its greatest usefulness in connection with the aging and testing of lamps, audions and similar devices, it will be understood that the machine may equally well be used to age and test other electrical devices such as resistances, repeater coils, and in general any electrical device that is required to come up to certain predetermined electrical standards, such as continuity, resistance impedance, capacitance and other electrical characteristics.

What is claimed is:

1. In combination in a unitary machine, a test unit, and automatic aging mechanism comprising a rotatable hollow drum carrying a plurality of vacuum tube sockets, a plurality of commutator strips carried by said drum, a plurality of stationary brushes, one for each of said commutator strips and a unitary oscillating means for automatically unplugging tubes from said sockets and transferring and plugging the transferred tubes into the test unit.

2. A unitary aging and testing machine for vacuum tubes comprising a rotatable aging drum and a conveyor testing unit immediately adjacent to said drum, means for operating said drum and said testing unit in timed relation, and an oscillatory frame for unplugging vacuum tubes from the drum and plugging them directly into said testing unit.

3. An aging and testing machine according to claim 2 in which the aging drum is mounted for rotation about a horizontal axis and the conveyor tester moves in a substantially horizontal direction immediately in front of said drum.

4. An automatic aging and testing machine comprising a rotatable drum carrying devices to be aged, a conveyor immediately adjacent to said drum, means for automatically unplugging said devices from said drum and for plugging said devices directly into said conveyor, and means associated with said conveyor for subjecting said devices to a test while on said conveyor before they have lost any appreciable heat.

5. A machine according to claim 4 in which said rotatable drum and said conveyor are provided with a cam drive shaft and means for selectively coupling said shaft to either said drum or said conveyor.

6. An automatic aging and testing machine comprising a rotatable aging drum, a test conveyor immediately adjacent to said drum, vacuum tube sockets carried by said drum, vacuum tube sockets carried by said conveyor, and means for transferring a vacuum tube directly from a socket on the drum to a socket on the conveyor.

7. A machine according to claim 6 in which the transferring means includes a pair of resilient members adapted to grip the vacuum tube.

8. A machine according to claim 6 in which the transferring means includes a group of gripper members adapted to grip a plurality of vacuum tubes in the drum, and means for oscillating said gripper members between said drum and said conveyor.

9. Means for gripping and transferring a vacuum tube comprising a member having a notch therein adapted to surround a portion of a vacuum tube and a pair of resilient rollers mounted on opposite sides of the notch.

10. A unitary machine for aging and testing vacuum tubes, comprising an aging unit, a testing unit immediately adjacent said aging unit, and means for simultaneously and automatically transferring a group of vacuum tubes from the aging unit to the testing unit whereby said tubes may be tested immediately without any substantial loss of heat, said means comprising a bar carrying a plurality of resilient vacuum tube gripping members, and means for oscillating said bar.

11. In a machine of the character described the combination of means for supporting a plurality of vacuum tubes, a transfer bar having a plurality of recesses therein, a pair of resilient rollers cooperating with each notch, means for moving said bar vertically in one direction with relation to the vacuum tubes to cause said rollers to grip and retain the vacuum tubes in said notches and for moving the side bar in the opposite direction to release said vacuum tubes from said rollers.

12. In a machine of the character described the combination of a conveyor test unit, a rotatable aging unit having a discharge point above the conveyor immediately adjacent thereto, means for automatically removing vacuum tubes from said aging unit and for moving said vacuum tubes in a horizontal direction away from the aging unit, and for plugging said vacuum tubes directly into the conveyor whereby said tubes may be tested immediately without any appreciable loss of heat.

13. In a machine of the character described the combination of an aging unit, a testing unit, means for automatically gripping a vacuum tube while in said aging unit, means for moving said gripping means in a substantially horizontal direction away from said aging unit to remove the gripped vacuum tubes therefrom to a point in front of the conveyor, and means for moving said gripping means in a reverse horizontal direction to plug the gripped vacuum tubes into the conveyor.

14. In a machine for automatically aging and testing vacuum tubes the combination of a rotatable aging device and a conveyor testing device, said conveyor being disposed immediately adjacent to said aging device and movable in a path parallel to the axis of said aging device, means for transferring vacuum tubes from the aging device to the testing device directly whereby said tubes may be tested immediately without any appreciable loss of heat, and means for moving the aging device and conveyor in timed relation to each other.

15. A machine according to claim 14 in which means are provided for automatically unplugging a group of vacuum tubes from the aging device and for plugging them into the conveyor.

16. In a machine of the character described the combination of an aging unit, a testing unit, means for simultaneously gripping and supporting a plurality of vacuum tubes, and means for moving said gripping member in a radial direction away from said aging unit, then downwardly to a point in front of said test unit, and then horizontally towards said test unit.

17. In a unitary machine for automatically aging and testing vacuum tubes the combination of an aging unit, a testing unit immediately adjacent to said aging unit, means for directly transferring a vacuum tube to be tested from the aging unit to the testing unit whereby said tube may be tested immediately without any appreciable loss of heat, said testing unit comprising a commutator strip, a conveyor member for supporting and moving the vacuum tubes in said testing unit, and means for completing a circuit from one element of the vacuum tube to said conducting strip, and means for automatically plugging sets of tubes into said testing unit.

18. In an automatic testing machine, means for testing vacuum tubes comprising an endless chain conveyor carrying a plurality of vacuum tube sockets, a potential source for subjecting the vacuum tubes in said sockets to different tests and a commutator mechanism carried by said conveyor for determining the order in which said potential sources are applied to said vacuum tubes, and means for automatically plugging vacuum tubes to be tested into said sockets.

19. Means for testing vacuum tubes comprising an endless chain conveyor carrying a plurality of vacuum tube sockets, a commutator mechanism carried by said conveyor, and means for moving said conveyor to bring the vacuum tubes in said sockets successively into different positions where said tubes are subjected to predetermined electrical tests, and means for automatically plugging vacuum tubes to be tested into said sockets.

20. Means for testing vacuum devices comprising a conveyor like member having a plurality of vacuum tube sockets, a single oscillatory means for automatically plugging into said sockets simultaneously a plurality of vacuum tubes, and means for subjecting each of said tubes in succession to different electrical tests, and means for operating said plugging means in timed relation to the movement of said conveyor.

21. In a machine of the character described an electric aging unit, means for testing electrical devices comprising a conveyor-like member immediately adjacent to said aging unit and having a plurality of sockets for receiving and supporting the device to be tested, a set of stationary commutator strips each connected to a source of test potential, and a set of brushes carried by said conveyor for completing the circuit from said strips to parts of the said device, and means for directly and automatically plugging said device into one of said sockets whereby said device may be tested immediately without any appreciable loss of heat.

22. A machine according to claim 21 in which said strips are arranged in groups, each corresponding to a different test position, and means are provided for applying different test conditions to said strips at the said positions.

23. In a machine of the character described the combination of an aging unit, a testing unit immediately adjacent to said aging unit, means for simultaneously and directly transferring a plurality of devices to be tested from the aging unit to the testing unit whereby said devices may be tested immediately without any appreciable loss of heat, and means for testing said transferred devices in succession.

24. In a machine of the character described the combination of an aging unit and a testing unit immediately adjacent thereto, means for automatically unplugging vacuum tubes in sets from the aging unit and automatically and directly plugging them into the test unit whereby said tubes may be tested immediately without appreciable loss of heat, and means associated with said testing unit for testing the filaments of the tubes for unstandard conditions.

25. In a machine of the character described the combination of an aging unit and a testing unit immediately adjacent thereto, means for automatically unplugging vacuum tubes in sets from the aging unit and automatically and directly plugging them into the test unit, whereby said tubes may be tested immediately without appreciable loss of heat and means associated with said testing unit for testing the gas content of each tube.

26. In a machine of the character described the combination of an aging unit and a testing unit immediately adjacent thereto, means for automatically unplugging vacuum tubes in sets from the aging unit and automatically and directly plugging them into the test unit whereby said tubes may be tested immediately without appreciable loss of heat, and means associated with said testing unit for testing the anode current of the tubes.

27. In a machine of the character described the combination of an aging unit and a testing unit immediately adjacent thereto, means for automatically unplugging vacuum tubes in sets from the aging unit and automatically and directly plugging them into the test unit whereby said tubes may be tested immediately without appreciable loss of heat, and means associated with said testing unit for testing the grid current of the tubes.

28. In a machine of the character described the combination of an aging unit and a testing unit immediately adjacent thereto, means for automatically unplugging vacuum tubes from the aging unit and automatically and directly plugging them into the test unit whereby said tubes may be tested immediately without appreciable loss of heat, and means associated with said testing unit for testing the total emission on the cathode.

ALLEN B. DU MONT.
RAYMOND M. ZIMBER.